(12) United States Patent
Ludin et al.

(10) Patent No.: US 9,500,249 B2
(45) Date of Patent: Nov. 22, 2016

(54) ENERGY ABSORBING LINK (71) Applicant: The Boeing Company, Chicago, IL (US)

(72) Inventors: Douglas R. Ludin, Malvern, PA (US); Matthew S. Stauffer, West Chester, PA (US); Akif O. Bolukbasi, Mesa, AZ (US); Terrence S. Birchette, Chandler, AZ (US)

(73) Assignee: THE BOEING COMPANY, Chicago, IL (US)

( * ) Notice: Subject to any disclaimer, the term of this patent is extended or adjusted under 35 U.S.C. 154(b) by 100 days.

(21) Appl. No.: 14/641,586

(22) Filed: Mar. 9, 2015

(65) Prior Publication Data

US 2016/0265613 A1 Sep. 15, 2016

(51) Int. Cl.
F16F 7/12 (2006.01)

(52) U.S. Cl.
CPC ...................... *F16F 7/12* (2013.01)

(58) Field of Classification Search
CPC .............. F16F 7/12; F16F 7/126; F16F 7/127; B60G 7/001; B60G 2206/161
USPC .................. 188/377, 371; 248/548
See application file for complete search history.

(56) References Cited

U.S. PATENT DOCUMENTS

| | | | | |
|---|---|---|---|---|
| 4,337,852 A * | 7/1982 | Flory | ...................... | B63B 21/00 188/375 |
| 4,593,870 A * | 6/1986 | Cronkhite | ............... | B64C 1/062 188/375 |
| 5,141,248 A * | 8/1992 | Haldric | ................... | F16F 7/123 180/271 |
| 5,529,276 A * | 6/1996 | Szablya | .................. | E04H 12/20 248/500 |
| 6,244,496 B1 * | 6/2001 | Kato | ..................... | B23K 20/129 228/112.1 |
| 6,298,962 B1 * | 10/2001 | Kato | ..................... | B60G 7/001 188/321.11 |
| 6,308,809 B1 * | 10/2001 | Reid | ....................... | F16F 7/125 188/377 |
| 6,325,567 B1 * | 12/2001 | Kato | ..................... | B60G 7/001 228/112.1 |
| 6,382,583 B1 * | 5/2002 | Hill, III | ................... | E04H 12/20 174/40 TD |
| 6,598,778 B2 * | 7/2003 | Konno | ................. | B23K 20/129 228/112.1 |
| 6,619,533 B1 * | 9/2003 | Hootman | ................ | B23P 13/04 228/112.1 |

(Continued)

OTHER PUBLICATIONS

Carstensen, Development and Validation of a Virtual Prototype Airframe Design as Part of the Survivable Affordable Repairable Airframe Program; Annual Forum Proceedings—American Helicopter Society. vol. 64. No. 1. American Helicopter Society, Inc, 2008.

(Continued)

*Primary Examiner* — Thomas Irvin
(74) *Attorney, Agent, or Firm* — MH2 Technology Law Group LLP (57) ABSTRACT

An apparatus and method for a composite structural aircraft transmission support link having an integral energy-absorbing feature is disclosed. The link is a two-force member that can carry structural loads up an ultimate load. When loaded beyond ultimate load the design allows sections of the link to fail in a controlled and progressive manner, so that energy is absorbed over a defined stroking distance.

22 Claims, 4 Drawing Sheets

(56) References Cited

U.S. PATENT DOCUMENTS

| | | | |
|---|---|---|---|
| 6,776,370 B2* | 8/2004 | Struzik | B64C 27/001 188/377 |
| 6,913,288 B2* | 7/2005 | Schulz | B60R 22/28 188/371 |
| 7,004,485 B2* | 2/2006 | Spagnuolo | B62D 7/20 280/93.51 |
| 7,571,917 B2* | 8/2009 | Ruehe | B60G 7/001 180/274 |
| 8,366,045 B2* | 2/2013 | Goncalves De Oliveira | G01L 1/06 244/108 |
| 8,528,708 B2* | 9/2013 | Sakai | F16F 9/0218 16/66 |
| 8,813,926 B2* | 8/2014 | Tanaka | B29C 70/086 188/371 |
| 9,321,317 B2* | 4/2016 | Gleason | B60G 7/001 |
| 2015/0158456 A1* | 6/2015 | Cheng | B60N 2/2812 297/480 |
| 2016/0031278 A1* | 2/2016 | Schindler | B60G 7/001 280/124.125 |
| 2016/0207369 A1* | 7/2016 | Krahn | F16F 1/26 |

OTHER PUBLICATIONS

Zimmerman, et al. Aircraft Crash Survival Design Guide. vol. 3. Aircraft Structural Crash Resistance. Simula Inc Phoenix AZ, 1989.

* cited by examiner

ENERGY ABSORBING LINK

BACKGROUND

Field

This technology as disclosed herein relates generally to two force members and, more particularly, to a link having an energy absorbing component.

Background

Current solutions for providing an energy absorbing link, are limited or not in practice at all. One possible example of a current practice is the use of metallic solutions such as corrugated and slotted tubes, however, these solutions are typically heavy and are not typically capable of absorbing a sufficient amount of energy. Energy-absorbing bearings are feasible but have a limited stroking distance to absorb an amount of energy that is adequate for what is needed. Fluid-filled struts are in practice for energy absorbing links.

An energy-absorbing link structure that attenuates the energy produced by heavy mass items is needed that is lighter in weight than prior solutions and that has a longer stroke length during maximum load conditions.

SUMMARY

The technology as disclosed herein is a method and apparatus for a two force structural member that is utilized as a link between two heavy structures comprising an energy absorbing tab adjacent a mounting hole of a link member. One embodiment of the technology is a composite structural transmission support link which has a novel integral energy-absorbing feature. The link can be a two-force member that can carry structural loads up an ultimate load. When loaded beyond ultimate load, such as in a crash event, features in the design allow sections of the link to fail in a progressive manner to absorb energy over a defined stroking distance. The energy absorbing link technology as disclosed can be utilized to connect or link two heavy structures.

A link can be designed to support a heavy mass during normal operations of the heavy mass components up to an ultimate load. When this load is exceeded, for example, during a crash event, the energy absorbing technology as disclosed is designed to attenuate energy of the heavy mass by means of controlled failure through a defined stroke distance—which acts to shed energy of the system, for example, an aircraft system. After completion of the stroke of the mass over a defined distance, the link remains intact and imparts a reduced force to the heavy structure, such as an airframe, during the stroke.

In one implementation of the technology as disclosed, a slot can be machined or formed into a link to form a weak region under a bushing area. With one implementation, the weak region can be positioned between two thru-holes used to attach the link between two heavy structures, which can absorb compression loads. With another implementation, the weak region can be position on a far side of a thru-hole between the thru-hole and the end of the link, which can absorb tension loads (tensile loads).

When the component is loaded in compression, the slot can absorb the energy via progressive failure. Ply drops serve as sacrificial components that will fail when stressed beyond maximum capacity, thereby reducing the initial load spike. Ply drops (ply drop-offs) are thickness variations in the laminate composite accomplished by dropping or eliminating plies along the length where, in this case, the ply drops are designed as fail points forming a weak region. This invention has significant weight advantages over a fluid filled strut, with similar energy absorbing capabilities.

One implementation for the basic design of a link can include a composite tube with a rectangular shaped cross section. Cutouts can be formed on each end of the link to act to form a clevis joint. Metallic bushings can be installed through the thru-holes in each arm of the clevis.

The technology as disclosed can be a two-force structural member that is loaded double-shear when subjected to a tensile or compressive load. A novel feature of this technology is a weak area designed into a section of the link on each clevis arm face, adjacent to the thru-hole, through which the clevis pin is inserted. The material in this area can form a slot with a width that roughly matches the outer diameter of the bushing installed through each clevis arm thru-hole. This feature is positioned so that, when the part is loaded in compression, the pin bushing fails and the composite material in the slot area and the ensuing crushing action absorbs energy.

The combination of the length of the slot and depth of the clevis arms define the stroke distance for energy absorption. The layup of the composite material in the slot can be configured to fail through progressive crushing at a relatively constant load, while the link stays intact during the failure event. The slot feature can be formed by a variation in the composite ply layup compared to the link layup, which may include: composite ply drop-offs; composite ply breaks; or, a machined taper in the slot. Ply breaks are when the fibers in a single composite ply are intentionally cut or a gap is left between two different plies.

An energy-absorbing (EA) slot can be integral to the link and can be designed to fail by crushing during a max-load event, thereby attenuating the energy of a heavy mass. One (1) EA slot at each end of link can effectively double the stroking distance and energy absorbed. A slot can be machined or formed into the EA link to form a 'weak' region adjacent a bushing bearing area when loaded in compression. If the bushing bearing is appropriately spaced from the end of the link, a slot can be formed in the EA link between the thru-hole and the end of the link to form a weak region adjacent a bushing area when loaded in tension. The slot can absorb energy by the crushing of the material of the slot. The slot can be formed of a composite material.

In another implementation, a gradual variation in the number of plies (ply drops) can be utilized to act as sacrificial components that will fail when stressed beyond maximum capacity to initiate crushing and reduce an initial load spike. The thickness and layup orientation of composite material in the slot can be tuned for a required energy attenuation.

One implementation of a two-force member energy-absorbing link structure can include an elongated structural member having first and second opposing ends and a lengthwise extending central axis where at least the first and second opposing ends of the elongated structural member is constructed of a primary material having a strength characteristic sufficient to link together two structures. A thru-hole can extend substantially orthogonally with respect to the central axis and through one or more of the first and second ends.

A section of the elongated structural member constructed of a secondary material and having a lesser strength characteristic than the strength characteristic of the material sufficient to link the two structures can be adjacent the thru-hole. The section can extend a lengthwise distance substantially along a direction that the lengthwise extending central axis extends and the section can extend from a point of the material proximate and adjacent the thru-hole. In one implementation, the elongated structural member can be a tubular elongated member, and one or more of the first and second opposing distal ends can have a u-shaped clevis structure with opposing first and second prong members forming the u-shaped clevis structure.

One implementation of the technology as disclosed herein can be a two-force member energy-absorbing link structure including an elongated structural member having first and second opposing distal ends and a lengthwise extending central axis where at least the first and second opposing distal ends of the elongated structural member are constructed with a primary material thickness having a strength characteristic sufficient to link together two structures. A thru-hole can extend substantially orthogonally with respect to the central axis and through one or more of the first and second distal ends. A recessed cutaway slot section of the elongated structural member, i.e. the link, can be constructed having a lesser thickness and lesser strength characteristic than the strength characteristic of the material sufficient to link the two structures, wherein the section extends a lengthwise distance substantially along a direction that the lengthwise extending central axis extends and wherein the section extends from a point of the material proximate and adjacent the thru-hole.

The level of energy absorbed can be adjusted through a combination of the design of the layup and form features. Composite materials can be utilized to enhance the performance parameters of the design. The benefits of a design using high performance composite materials is that very high levels of specific-sustained crush stress (per unit energy-absorption, in Joules/gm) may be obtained throughout a relatively large stroke distance, compared to metallic designs. This is particularly useful approach where the structural members also have the ability to attenuate the energy of heavy mass items, such as a rotorcraft transmission during a crash, for virtually no weight penalty.

The features, functions, and advantages that have been discussed can be achieved independently in various implementations or may be combined in yet other implementations, further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1-4 and like reference numerals are being used consistently throughout to refer to like and corresponding parts of the technology for all of the various views and figures of the drawing. Also, please note that the first digit(s) of the reference number for a given item or part of the technology should correspond to the figure number in which the item or part is first identified.

One implementation of the present technology as disclosed (comprising an energy-absorbing slot feature) teaches a novel apparatus and method for an energy-absorbing link.

Figure 1A:
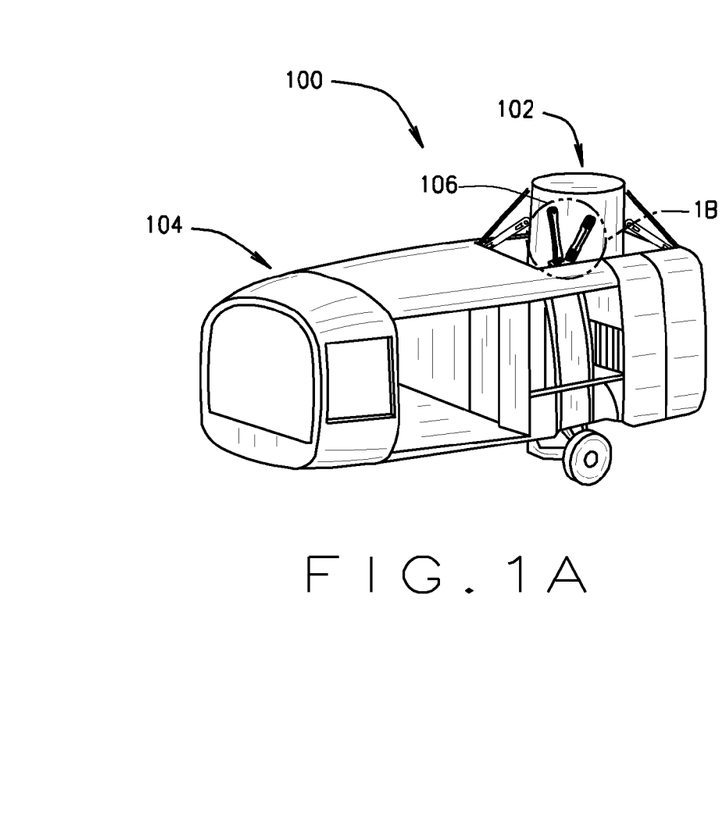
FIG. 1A is an illustration of two heavy mass structures being connected by links.
Figure 1B:
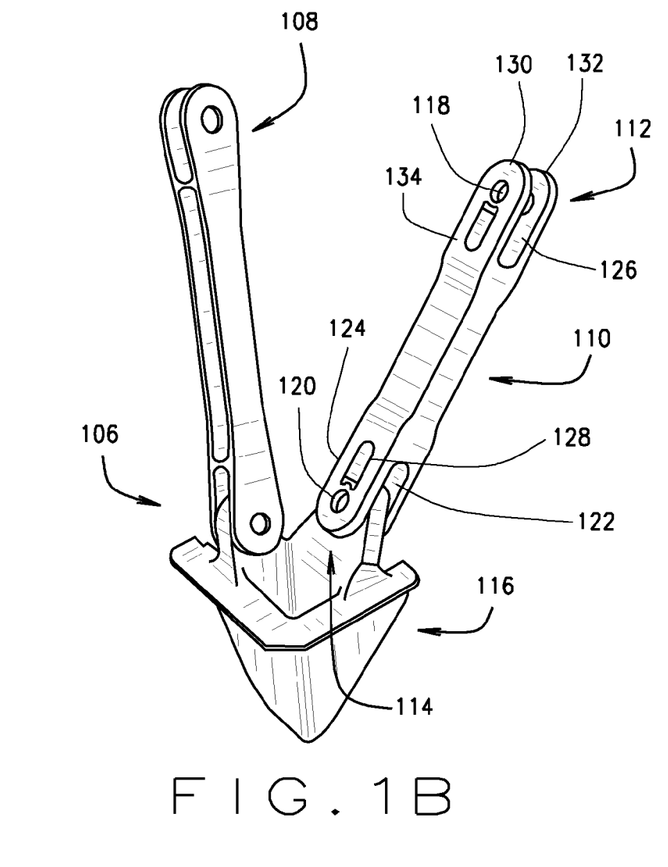
FIG. 1B is a magnified view of an encircled portion of FIG. 1A illustrating two links, which can be used to connect two heavy mass structures.

The details of the technology as disclosed and various implementations can be better understood by referring to the figures of the drawings. Referring to FIGS. 1A and 1B, an illustration of two heavy mass structures being connected by a link system 106 is shown, and an illustration of two links 108 and 110, which can be used to link two heavy mass structures, is shown. A two-force member energy-absorbing link structure 110 (see FIG. 1B) is shown, which can be connected between to two heavy structures, as illustrated in FIG. 1A, a first heavy structure 104 and a second heavy structure 102, (see FIG. 1A) of the two structure system 100. As illustrated in FIG. 1A, for example, the first heavy structure can be an aircraft main structure 104 and the second heavy structure can be an aircraft drive system 102. Encircled area 106 is further illustrated in FIG. 1B.

Referring to FIG. 1B, an elongated structural member, which is a link 110, is shown having first 112 and second 114 opposing ends. The portion of the link system 106 as illustrated shows a first link 108 and a second link 110. First link 108 does not illustrate the present technology as disclosed herein while second link 110 does. Both the first link 108 and the second link 110 are connected by their respective second opposing ends 114 to a mounting structure 116. The second link 110 has a lengthwise extending central axis (identified by reference numeral 214 in FIGS. 2B and 3A) where at least the first and second opposing ends 112, 114 of the link 110 are constructed of a primary material 134 having a strength characteristic sufficient to link together two structures (for example, structures 104 and 102).

A first thru-hole 118 and a second thru-hole 120 can extend substantially orthogonally with respect to the central axis (see item 214 of FIGS. 2B and 3A) and through one or more of the first 112 and second 114 opposing ends. A first section 126 and/or a second section 128 of the elongated structural member, which is the second link 110, can be constructed of secondary material having a lesser strength characteristic than the strength characteristic of the material sufficient to link the first heavy structure and the second heavy structure. The first and second sections 126 and 128 can extend a lengthwise distance substantially along a direction that the lengthwise extending central axis 214 extends. The first and second sections can extend from a location 124 of the material proximate and adjacent the thru-hole.

In one implementation of the technology, the two-force member energy-absorbing link 110 can be constructed such that the elongated structural member, link 110, is a tubular elongated member. The two-force member energy-absorbing link 110 as illustrated where one or more of the first 112 and second 114 opposing distal ends have a u-shaped clevis structure with opposing first 132 and second 130 prong members (i.e. arms) forming the u-shaped 122 clevis structure. The first and second thru-holes, as illustrated at 118 and 120, can extend through one or more of the first 130 and second 132 prong members.

The section, illustrated by 126 or 128, of the elongated structural member 110 can be constructed of a secondary material and can be an elongated slot 126 or 128 extending a lengthwise distance. The first and second sections of weakened material 126 and 128 of the elongated structural member, link 110, can be formed in the primary material as a weakened region of the elongated structural member, i.e. the link 110, to allow the weakened sections 126 and 128 to crush when sufficient compression loads are applied to the elongated structural member in the direction that the lengthwise extending central axis 214 extends.

Figure 2A:
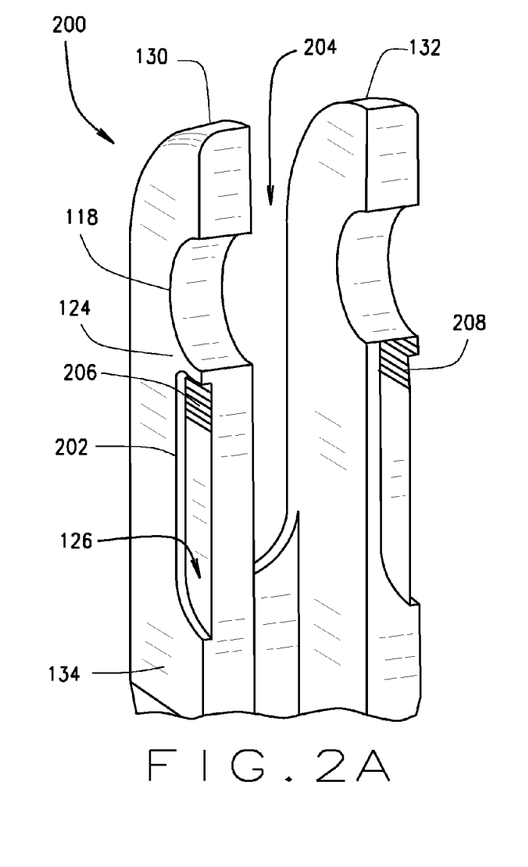
FIG. 2A is a sectional view of a clevis of a link.
Figure 2B:
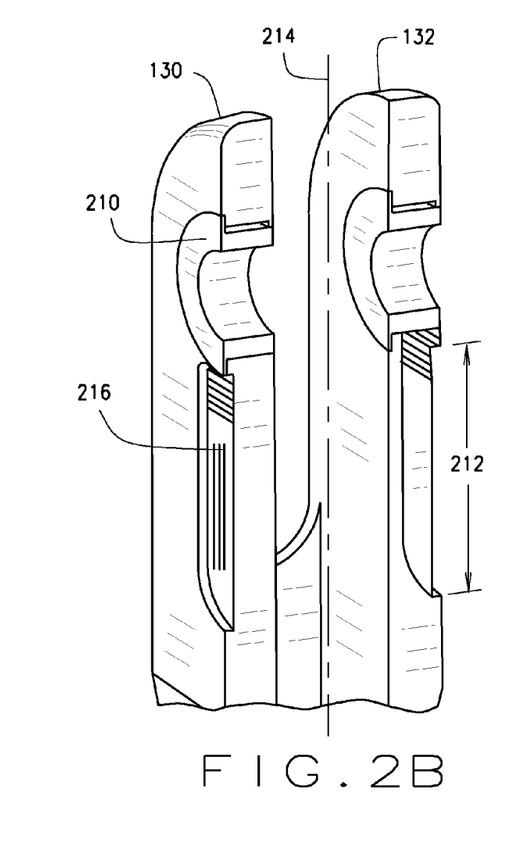
FIG. 2B is another sectional view of a clevis and bushing bearing of a link.

Referring to FIGS. 2A and 2B, a sectional view 200 of first and second arms 130 and 132 of a link is shown. Referring to FIG. 2B, another sectional view of the clevis arms 130 and 132 and bushing bearing 210 of a link is shown. The section (i.e. slot) 126 can be formed with ply-drops 206 and 208 proximate the thru-hole 118 to act as a weakened area to induce a controlled failure and to initiate crushing of the slot 126 constructed of a secondary material to reduce an initial load spike. The slot 126 comprising the secondary material can also be a recess 202. With one implementation of the technology as disclosed, the section of secondary material 126, which can be a recessed slot 202, can be formed having lengthwise slits 216 (See FIG. 2B) extending at least partially from one end of the slot to the opposing end of the slot in the direction that the lengthwise extending central axis extends.

With one implementation of the technology as disclosed a two-force member energy-absorbing link structure can include an elongated tubular member—i.e. a link 110. The tubular member can have a rectangular cross section. The link can have first and second opposing distal ends and a lengthwise extending central axis where the elongated structural member is constructed of a primary material having a strength characteristic sufficient to link together two structures. With this implementation a thru-hole can extend substantially orthogonally with respect to the central axis and through one or more of the first and second distal ends. A section 126 of the elongated structural member can be constructed of secondary material 134 having a lesser strength characteristic than the strength characteristic of the material sufficient to link two structures and said section can extend a lengthwise distance 212 substantially along a direction that the lengthwise extending central axis 214 extends and said section extends from a location 124 of the material proximate and adjacent the through hole.

The first and second opposing ends can have a u-shaped clevis structure 204 with opposing first 130 and second 132 prong members forming the u-shaped clevis structure 204. The thru-hole 118 extends through one or more of the first and second prong members 130, 132. The section of the elongated structural member constructed of a secondary material is an elongated slot 126 extending a lengthwise distance 212 (see FIG. 2B). In one implementation of the technology, the section of the elongated tubular member can be formed in the primary material as a weakened region of the elongated tubular member to allow the section to crush when sufficient compression loads are applied to the elongated tubular member in the direction that the lengthwise extending central axis 214 extends. The section can be formed with ply-drops 206 proximate the thru-hole 118 to act to initiate crushing of the secondary material to reduce an initial load spike. The section can be formed having lengthwise slits 216 extending at least partially in the direction that the lengthwise extending central axis extends.

Figure 3A:
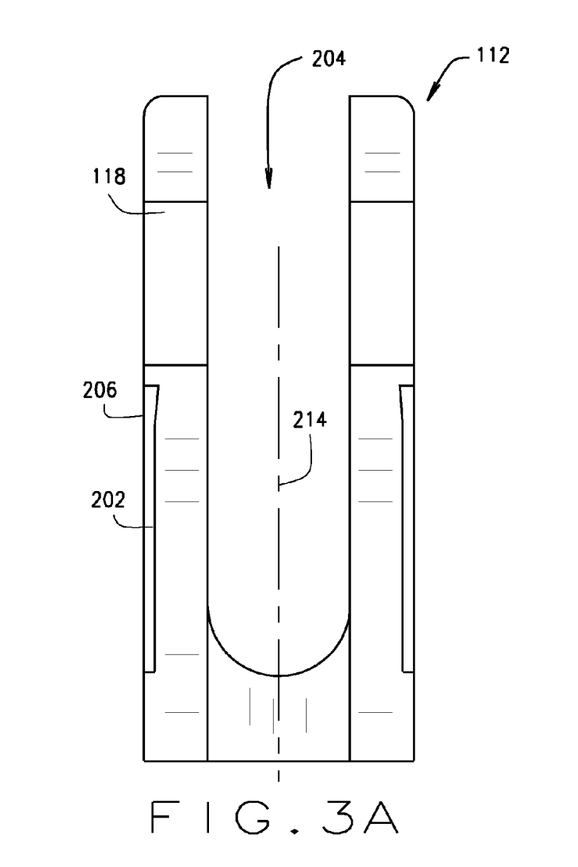
FIG. 3A is a front sectional view of a clevis of a link.
Figure 3B:
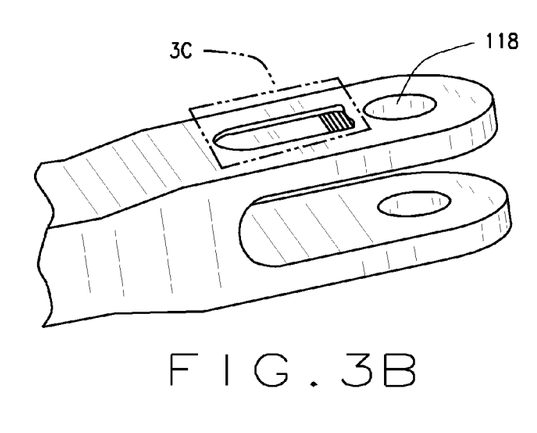
FIG. 3B is a perspective view of a clevis of a link.
Figure 3C:
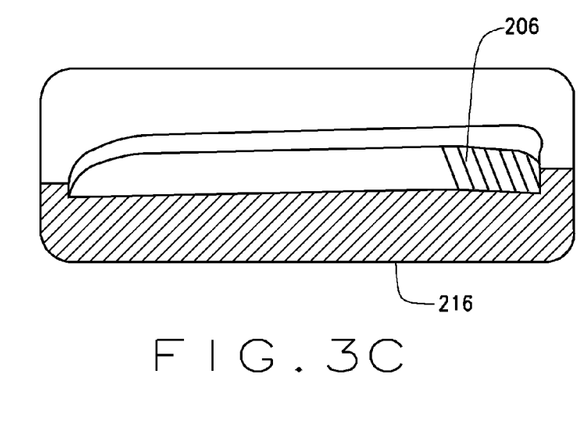
FIG. 3C is a magnified view of a portion of FIG. 3B, providing a sectional perspective view of a slot area.

Referring to FIGS. 3A, 3B and 3C, a front sectional view of a clevis of a link is shown, a perspective view of a clevis of a link is shown and a sectional perspective view a slot area is shown. An elongated structural member, i.e. the link 110, can have first and second opposing ends. The first end 112 is shown in FIG. 3A. A lengthwise extending central axis 214 can extend in the direction illustrated where at least the first and second opposing ends of the link 110 is constructed having a primary material thickness having a strength characteristic sufficient to link together two structures.

As can be seen, a thru-hole 118 extends substantially orthogonally with respect to the central axis 214. A recessed cutaway slot 202 section in the link 110 is shown and can be constructed of a material having a lesser thickness and lesser strength characteristic than the strength characteristic of the material sufficient to link the two structures. The recessed cutaway slot 202 can extend a lengthwise distance substantially along a direction that the lengthwise extending central axis extends and said section can extend from a location proximate and adjacent the thru-hole.

The first and second opposing ends can have a u-shaped 204 clevis structure with opposing first and second arm members forming the u-shaped clevis structure. The section can be formed with ply-drops 206 proximate the thru-hole 118 to allow for the initiation of the crushing of the secondary material to reduce an initial load spike. The section can be formed having lengthwise slits 216 extending at least partially in the direction that the lengthwise extending central axis extends.

Figure 4A:
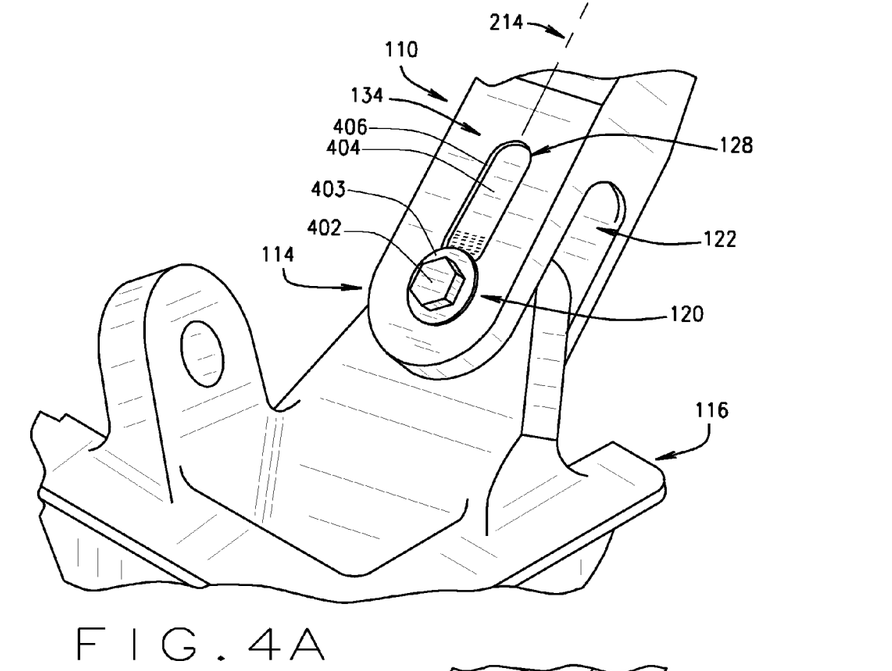
FIG. 4A is a magnified view of one end of a link prior a controlled failure.
Figure 4B:
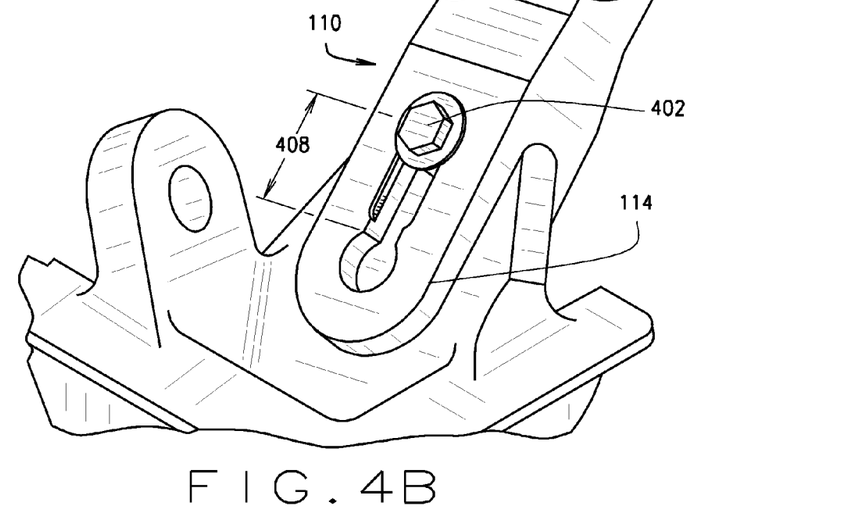
FIG. 4B is a magnified view of one end of a link after a controlled failure.

Referring to FIGS. 4A and 4B, an illustration is provided for one end of a link before (FIG. 4A) and after (FIG. 4B) a controlled failure. A view of one end 114 of a link 110 is shown. The link 110 is shown mounted to a structure 116 using the clevis 122 and a mounting bolt 402 and washer 403. The bolt 402 is shown extending through a thru-hole 120 of the clevis 122 and attaching the link 110 to the structure 116. The link 110 is constructed of a primary material 134. The link 110 can have a section of weakened material 128. The section of weakened material 128 can be an elongated slot 404 that extends lengthwise in the same direction as the central axis 214. The elongated slot 404 can also have a recess 406 as illustrated where material can be removed further weakening the area. FIG. 4B illustrates one end 114 of the link 110 after a controlled failure where the bolt 402 has traversed along the stroke distance 408 and proximately along the same direction as the axis 214, thereby crushing the section of weakened material 128, while bolt 402 remains sufficiently intact such that the link 110 is still mounted to the structure 116.

The various energy-absorbing link examples shown above illustrate a link between two heavy structures. A user of the present technology as disclosed may choose any of the above implementations, or an equivalent thereof, depending upon the desired application. In this regard, it is recognized that various forms of the subject energy-absorbing link could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A two-force member energy-absorbing link structure comprising:
    an elongated structural member having first and second opposing ends and a lengthwise extending central axis, wherein at least the first and second opposing ends of the elongated structural member are constructed of a primary material having a strength characteristic sufficient to link together two structures;
    a thru-hole extending substantially orthogonally with respect to the central axis and through the first opposing end; and
    a section of the elongated structural member constructed of secondary material having a lesser strength characteristic than the strength characteristic of the primary material, said section extending a lengthwise distance substantially along a direction that the lengthwise extending central axis extends, and said section extending from a location proximate and adjacent the thru-hole,
    wherein the section is configured to deform when exposed to a predetermined axial compression load, and wherein a length of the elongated structural member remains substantially the same before and after the section deforms.

2. The two-force member energy-absorbing link structure as recited in claim 1, wherein the elongated structural member is a tubular elongated member.

3. The two-force member energy-absorbing link structure as recited in claim 1, wherein the first opposing end has a u-shaped clevis structure with opposing first and second prong members forming the u-shaped clevis structure.

4. The two-force member energy-absorbing link structure as recited in claim 3, wherein the thru-hole extends through the first prong member.

5. The two-force member energy-absorbing link structure as recited in claim 1, wherein the section of the elongated structural member constructed of a secondary material is an elongated slot extending a lengthwise distance.

6. The two-force member energy-absorbing link structure as recited in claim 5, wherein the section of the elongated structural member is a weakened region to allow the section to deform when the predetermined axial compression load is applied to the elongated structural member in the direction that the lengthwise extending central axis extends.

7. The two-force member energy-absorbing link structure as recited in claim 6, wherein the section includes ply-drops proximate the thru-hole to initiate crushing of the secondary material to reduce an initial load spike.

8. The two-force member energy-absorbing link structure as recited in claim 6, wherein the secondary material is recessed with respect to the primary material, and wherein the secondary material includes lengthwise slits extending at least partially in the direction that the lengthwise extending central axis extends.

9. The two-force member energy-absorbing link structure as recited in claim 1, wherein the thru-hole is configured to have a fastening member positioned therein, and wherein the fastening member is configured to slide into and deform the section in response to the axial compression load.

10. A two-force member energy-absorbing link structure comprising:
    an elongated tubular member having first and second opposing ends and a lengthwise extending central axis, wherein the elongated tubular member is constructed of a primary material having a primary material thickness and has a strength characteristic sufficient to link together two structures;
    a thru-hole extending substantially orthogonally with respect to the central axis and through the first opposing end; and
    a section of the elongated structural member constructed of secondary material having a secondary material thickness with a thickness less than the primary material thickness, and having a lesser strength characteristic than the strength characteristic of the primary material, and said section extending a lengthwise distance substantially along a direction that the lengthwise extending central axis extends and said section extends from a point of the material proximate and adjacent the through hole,
    wherein the section is configured to deform when exposed to a predetermined axial compression load, and wherein a length of the elongated structural member remains substantially the same before and after the section deforms.

11. The two-force member energy-absorbing link structure as recited in claim 10, wherein one or more of the first and second opposing distal ends have a u-shaped clevis structure with opposing first and second prong members forming the u-shaped clevis structure.

12. The two-force member energy-absorbing link structure as recited in claim 11, wherein the thru-hole extends through one or more of the first and second prong members.

13. The two-force member energy-absorbing link structure as recited in claim 10, wherein the section of the elongated structural member constructed of a secondary material is an elongated slot extending a lengthwise distance.

14. The two-force member energy-absorbing link structure as recited in claim 13, wherein the section of the elongated tubular member is formed in the primary material as a weakened region of the elongated tubular member to allow the section to deform when the predetermined axial compression load is applied to the elongated tubular member in the direction that the lengthwise extending central axis extends.

15. The two-force member energy-absorbing link structure as recited in claim 14, wherein the section is formed with ply-drops proximate the thru-hole to act as a trigger to initiate crushing of the secondary material to reduce an initial load spike.

16. The two-force member energy-absorbing link structure as recited in claim 14, wherein the section is formed having lengthwise slits extending at least partially in the direction that the lengthwise extending central axis extends.

17. A two-force member energy-absorbing link structure comprising:

an elongated structural member having first and second opposing ends and a lengthwise extending central axis, wherein at least the first and second opposing ends of the elongated structural member are constructed having a primary material thickness and having a strength characteristic sufficient to link together two structures;

a thru-hole extending substantially orthogonally with respect to the central axis and through the first opposing end; and a recessed cutaway slot section of the elongated structural member having a lesser thickness and lesser strength characteristic than the strength characteristic of the primary material, said section extending a lengthwise distance substantially along a direction that the lengthwise extending central axis extends, and said section extending from a location of the material proximate and adjacent the thru-hole, wherein the recessed cutaway slot section is configured to deform when exposed to a predetermined axial load, and wherein a length of the elongated structural member remains substantially the same before and after the recessed cutaway slot section deforms.

18. The two-force member energy-absorbing link structure as recited in claim 17, wherein the first opposing distal end has a u-shaped clevis structure with opposing first and second prong members forming the u-shaped clevis structure.

19. The two-force member energy-absorbing link structure as recited in claim 17, wherein the recessed cutaway slot section of the elongated structural member is formed as a weakened region of the elongated structural member to allow the recessed cutaway slot section of the elongated structural member to deform when the predetermined axial load compresses the elongated structural member in the direction that the lengthwise extending central axis extends.

20. The two-force member energy-absorbing link structure as recited in claim 19, wherein the recessed cutaway slot section is formed with ply-drops proximate the thru-hole to initiate crushing of the secondary material to reduce an initial load spike.

21. The two-force member energy-absorbing link structure as recited in claim 19, wherein the recessed cutaway slot section of the elongated structural member has lengthwise slits extending at least partially in the direction that the lengthwise extending central axis extends.

22. The two-force member energy-absorbing link structure as recited in claim 19, wherein the recessed cutaway slot section is formed as a weakened region of the elongated structural member to allow the section of the elongated structural member to deform when the predetermined axial is a tension that is applied to the elongated structural member in the direction that the lengthwise extending central axis extends.

* * * * *